United States Patent
Chen et al.

(10) Patent No.: US 8,723,660 B2
(45) Date of Patent: May 13, 2014

(54) DUAL-VISION DRIVING SAFETY WARNING DEVICE AND METHOD THEREOF

(75) Inventors: Yu-Sung Chen, Changua County (TW); Yi-Feng Su, Changhua County (TW); Chia-Tseng Chen, Changhua County (TW)

(73) Assignee: Automotive Research & Test Center, Chuanghua County (TW)

( * ) Notice: Subject to any disclaimer, the term of this patent is extended or adjusted under 35 U.S.C. 154(b) by 853 days.

(21) Appl. No.: 12/875,331

(22) Filed: Sep. 3, 2010

(65) Prior Publication Data

US 2011/0298602 A1 Dec. 8, 2011

(30) Foreign Application Priority Data

Jun. 8, 2010 (TW) ................................ 99118623 A

(51) Int. Cl.
*B60Q 1/00* (2006.01)
*G05D 1/00* (2006.01)
*A01B 69/00* (2006.01)
*B60T 7/16* (2006.01)
*B60K 28/16* (2006.01)
*G06K 9/00* (2006.01)

(52) U.S. Cl.
USPC ........... 340/435; 340/436; 340/438; 340/471; 340/903; 701/1; 701/41; 701/93; 180/169; 180/197; 180/282; 180/271; 382/104; 382/181; 345/7

(58) Field of Classification Search
CPC .................................. B60Q 9/008; B60Q 1/525
USPC ........................................................ 340/435
See application file for complete search history.

(56) References Cited

U.S. PATENT DOCUMENTS

| | | | | |
|---|---|---|---|---|
| 6,819,779 | B1* | 11/2004 | Nichani | 382/104 |
| 7,680,323 | B1* | 3/2010 | Nichani | 382/154 |
| 2002/0176605 | A1* | 11/2002 | Stafsudd et al. | 382/106 |
| 2004/0118624 | A1* | 6/2004 | Beuhler et al. | 180/167 |
| 2005/0123173 | A1* | 6/2005 | Isaji et al. | 382/104 |
| 2005/0206510 | A1* | 9/2005 | Weber et al. | 340/435 |
| 2006/0072099 | A1* | 4/2006 | Hoashi | 356/4.01 |
| 2008/0043099 | A1* | 2/2008 | Stein et al. | 348/118 |
| 2010/0060735 | A1* | 3/2010 | Sato | 348/148 |

* cited by examiner

*Primary Examiner* — Fekadeselassie Girma
(74) *Attorney, Agent, or Firm* — Rosenberg, Klein & Lee

(57) ABSTRACT

The present invention discloses a dual-vision driving safety warning device and a method thereof. The device of the present invention comprises an image capture unit, an image processing unit, a vehicle status sensing unit, a warning judgment logic, and at least one warning unit. The image capture unit includes at least two image capture devices installed in a user's vehicle and capturing the images of the front traffic environment. The image processing unit processes the images and uses the vehicle status signals detected by the vehicle status sensing unit to calculate the distance between the user's vehicle and a front vehicle in the image. The warning judgment logic sends out a control signal when the user's vehicle deviates from a driving lane or approaches a front vehicle too much. The warning unit receives the control signal and sends out a warning signal, such as a sound or a flash, to remind the driver.

7 Claims, 9 Drawing Sheets

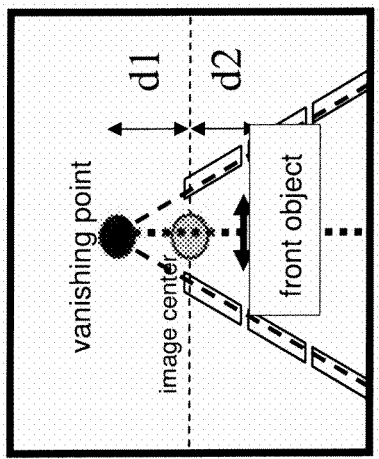
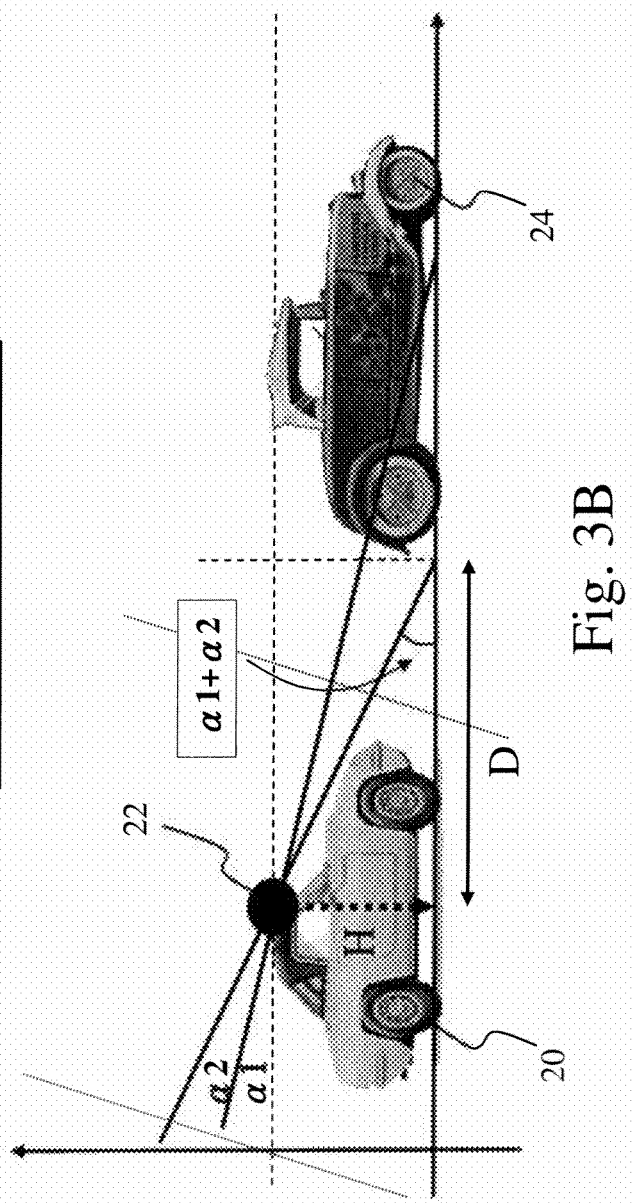
Fig. 3A
Fig. 3B

DUAL-VISION DRIVING SAFETY WARNING DEVICE AND METHOD THEREOF

BACKGROUND OF THE INVENTION

1. Field of the Invention

The present invention relates to a driving safety warning technology, particularly to a dual-vision driving safety warning device and a method thereof.

2. Description of the Related Art

The conventional driving safety warning systems normally use a laser or radar to detect the distance between the user's vehicle and the front obstacle/vehicle to prevent from the collision between the user's vehicle and the front vehicle. However, the conventional systems are expensive and incapable of perceiving driving lane deviation or recognizing traffic signs. Therefore, the visibility of the conventional driving safety warning systems is very low in the market.

Thus, the visual-type driving safety warning system gradually earns attention. In comparison with the laser or radar driving safety warning system, the visual driving safety system can recognize the traffic environment, such as lane marks, traffic signs and obstacles and has advantages of low cost and high integration capability. However, the current visual driving safety warning system is limited by the adopted lens and unable to detect the near field and the far field at the same time. Thus, the current visual driving safety warning systems is normally designed to only detect the near field. So far, the visual driving safety warning system able to detect the far field has not appeared yet. In fact, the greater the detection range and the higher the environment recognizability, the better the performance of the visual driving safety warning system. Obviously, the conventional technology cannot meet the requirement.

Accordingly, the present invention proposes a dual-vision driving safety warning device and a method thereof to overcome the abovementioned problems. The principles and embodiments of the present invention will be described in detail below.

SUMMARY OF THE INVENTION

The primary objective of the present invention is to provide a dual-vision driving safety warning device and a method thereof, wherein at least two image capture devices are installed in the use's vehicle to respectively capture the images of the near filed and far field, and wherein the system estimates the distance between the user's vehicle and the front vehicle.

Another objective of the present invention is to provide a dual-vision driving safety warning method, wherein makes use of the tilt angles (elevation angles) of the image capture devices to intercompare and calibrate the roughly-estimated distance, and which examines whether the user's vehicle deviates from the driving lane or two vehicles are too close and provides corresponding warnings.

A further objective of the present invention is to provide a dual-vision driving safety warning method, wherein when the two image capture devices have an identical elevation angle, the detection of the front vehicle in the far field and the distance to the far-field front vehicle can be obtained from the detection range and the elevation angle of the near-field image capture device, whereby the present invention is exempted from the difficulty of detecting a far-field object in a vibrating vehicle.

To achieve the abovementioned objectives, the present invention proposes a dual-vision driving safety warning device, which comprises at least two image capture devices installed in a user's vehicle and capturing images of the front traffic environment, including images of complete lane marks; a vehicle status sensing unit sensing at least one vehicle status signal, including signals of speed, braking and direction lights; an image processing unit processing the images and calculating the distance between the user's vehicle and a front vehicle in the image; a warning judgement logic integrating the vehicle status signals and the calculation results of the image processing unit to perform an adaptive cruise control function and sending out a control signal when the user's vehicle deviates from the driving lane or two vehicles are too close; at least one warning unit connected with the image processing unit and the vehicle status sensing unit and controlled by the control signal to send out a warning signal.

The present invention also proposes a dual-vision driving safety warning method, which comprises steps: using an image capture unit installed in a user's vehicle to capture images of the front traffic environment, including images of complete lane marks; using an image processing unit to process the images, wherein the image processing unit further makes use of processing results and the vehicle status signal detected by a vehicle status sensing unit to calculate the distance between the user's vehicle and a front vehicle in the image; and using a warning judgement logic to output a control signal to enable a warning unit to send out a warning signal when the user's vehicle deviates from the driving lane or two vehicles are too close.

Below, the embodiments will be described in detail to make easily understood the objectives, technical contents, characteristics and accomplishments of the present invention.

BRIEF DESCRIPTION OF THE DRAWINGS

FIG. 3A is a diagram schematically showing the detection of a vanishing point, and FIG. 3B is a diagram schematically showing the method of using the elevation angles to estimate the distance to the front vehicle;

DETAILED DESCRIPTION OF THE INVENTION

The present invention proposes a dual-vision driving safety warning device and a method thereof, which can obtain the information of the traffic environment, provides an intelligent vehicle-following function for the driver and prevents the driver from an inattentive driving behavior, such as deviating from the driving lane or approaching the front vehicle too much.

Figure 1:
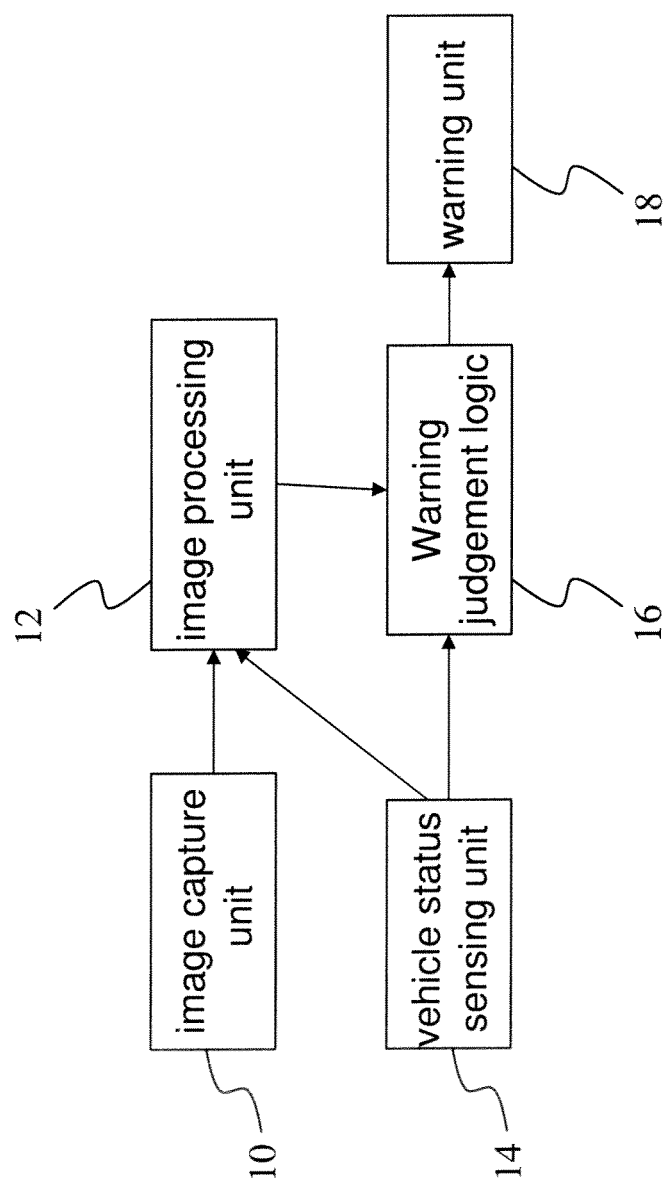
FIG. 1 is a block diagram schematically architecture of a dual-vision driving safety warning device according to one embodiment of the present invention.

Refer to FIG. 1 a block diagram schematically architecture of a dual-vision driving safety warning device according to one embodiment of the present invention. The device of the present invention comprises at least one image capture unit 10, an image processing unit 12, a vehicle status sensing unit 14, a warning judgement logic 16 and a warning unit 18. The image capture unit 10 includes at least two image capture devices installed in a user's vehicle and capturing the images of the front traffic environment. The two image capture devices respectively capture the near-field images and the far-field images. The vehicle status sensing unit 14 sensing the status signals of the user's vehicle, such as the signals of speed, braking, and direction lights. The image processing unit 12 includes a lane mark detection algorithm, a detection angle algorithm, a front vehicle detection algorithm, a distance estimation algorithm, and a distance calibration algorithm. The image processing unit 12 utilizes the algorithms and the vehicle status signals detected by the vehicle status sensing unit 14 to calculate the distance between the user's vehicle and a front vehicle in the image. The warning judgement logic 16 integrates the vehicle status signals and the calculation results of the image processing unit 12 to perform an adaptive cruise control function and sends out a control signal when the user's vehicle deviates from the driving lane or approaches the front vehicle too much. The warning unit 18 is connected with the image processing unit 12 and the vehicle status sensing unit 14 and controlled by the control signal of the vehicle status sensing unit 14 to send out a warning signal, such a buzzer sound or a LED light.

Figure 2:
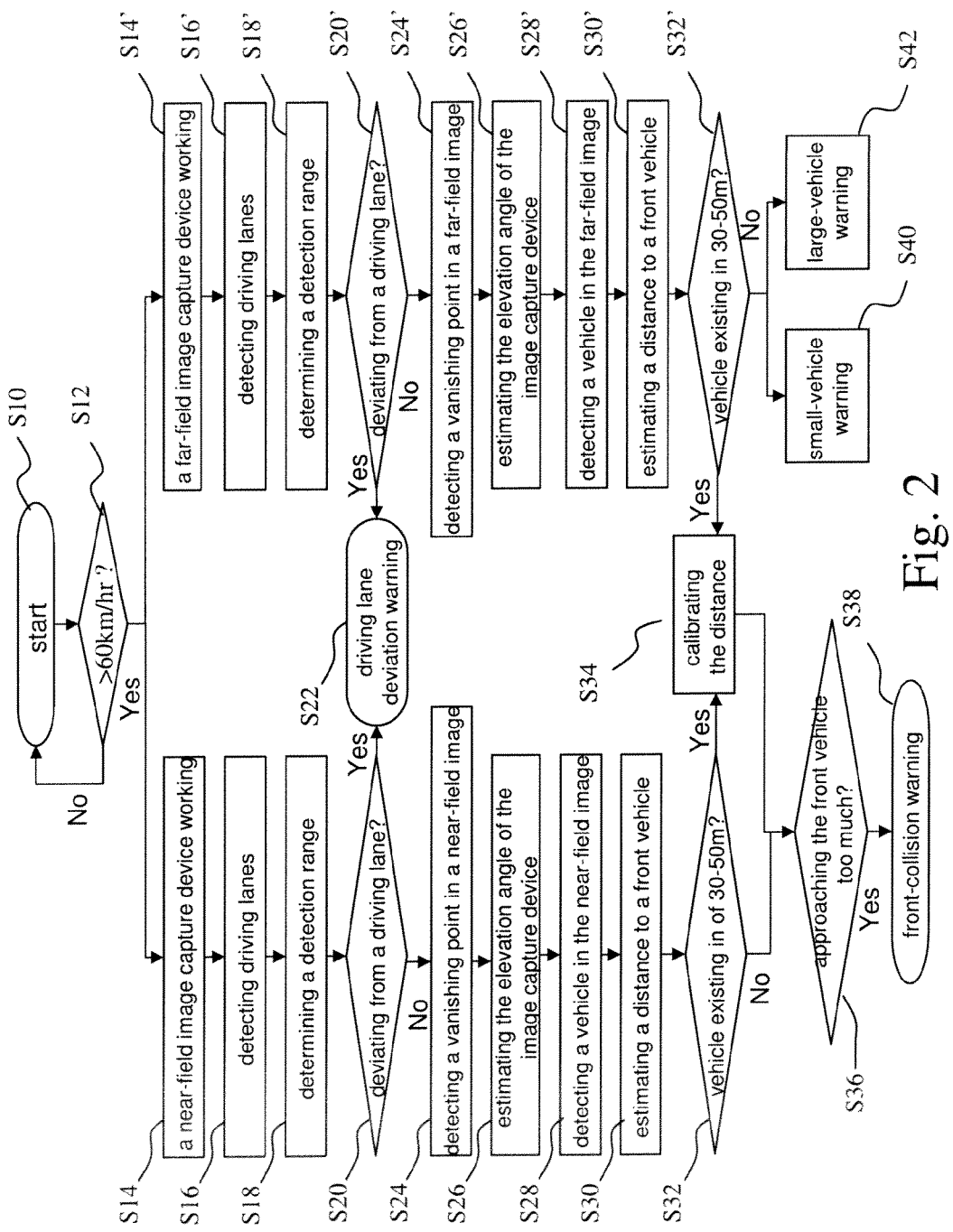
FIG. 2 is a flowchart of a dual-vision driving safety warning method according to one embodiment of the present invention.

Refer to FIG. 2 a flowchart of a dual-vision driving safety warning method according to one embodiment of the present invention. In Step S10, the device of the present invention is started. In Step S12, the vehicle status sensing unit detects whether the speed of the user's vehicle exceeds a preset value. In one embodiment, the preset value is 60 km/h. If the speed does not exceed the preset value, the process returns to Step S10. If the speed exceeds the preset value, the process proceeds to the next step. The two image capture devices respectively have different elevation angles to capture near-field images and far-field images for distance calculation. In Step S14-Step S20, one image capture device captures near-field images, and the lane mark detection algorithm detects the positions of the lane marks to determine the detection range and whether the user's vehicle deviates from the lane marks. If the extension line of the user's vehicle intersects the lane mark and the direction light on the same side is turned on, the process proceeds to Step S22, and the warning unit sends out a warning signal to warn the user that his vehicle is deviating from the driving lane. In Step S14'-Step S20', another image capture device captures far-field images, and the lane mark detection algorithm detects the positions of the lane marks to determine the detection range and whether the user's vehicle deviates from the lane marks. If the user's vehicle is deviating from the driving lane, the process proceeds to Step S22, and the warning unit sends out a warning signal to warn the user that his vehicle is deviating from the driving lane.

If the system determines that the user's vehicle does not deviate from the driving lane in Step S20 and Step S20', the two image capture devices respectively detect the vanishing points of the near field and the far field in Step S24 and Step S24'. Refer to FIG. 3A, wherein the image has a vanishing point, an image center, and a front object (a front vehicle), and wherein d1 denotes the distance between the vanishing point and the image center, and wherein d2 denotes the distance between the image center and the front object. In Step S26 and Step S26', the detection angle algorithm calculates the elevation angles of the two image capture devices. In Step S28 and Step S28', the front vehicle detection algorithm determines whether the front object is a vehicle. Firstly, the lane marks are detected. Next, a Sobel edge detection method is used to detect the horizontal edges and vertical edges of the front object and determine whether the width and height of the front object match the dimensions of a normal vehicle. If they match, the distance estimation algorithm calculates the distance between the user's vehicle and the front vehicle in Step S30 and Step S30'. Refer to FIG. 3B for the distance estimation method. In FIG. 3B, two image capture devices 22 are installed in a user's vehicle 20, but the two image capture devices 20 coincides with each other in the side view. The image capture devices 22 are at an altitude of H; the distance between the user's vehicle 20 and a front vehicle 24 is D; the two image capture devices 22 have an identical focal length f; the two image capture devices 22 respectively have elevation angles of α1 and α2. The distance D can be roughly estimated from the following equation:

$$D = H^* \tan(\alpha 1 + \alpha 2)$$
$$= H^*((1 - \tan\alpha 1 * \tan\alpha 2)/(\tan\alpha 1 + \tan\alpha 2))$$

wherein tan α1=d1/f and tan α2=d2/f.

Figure 4:
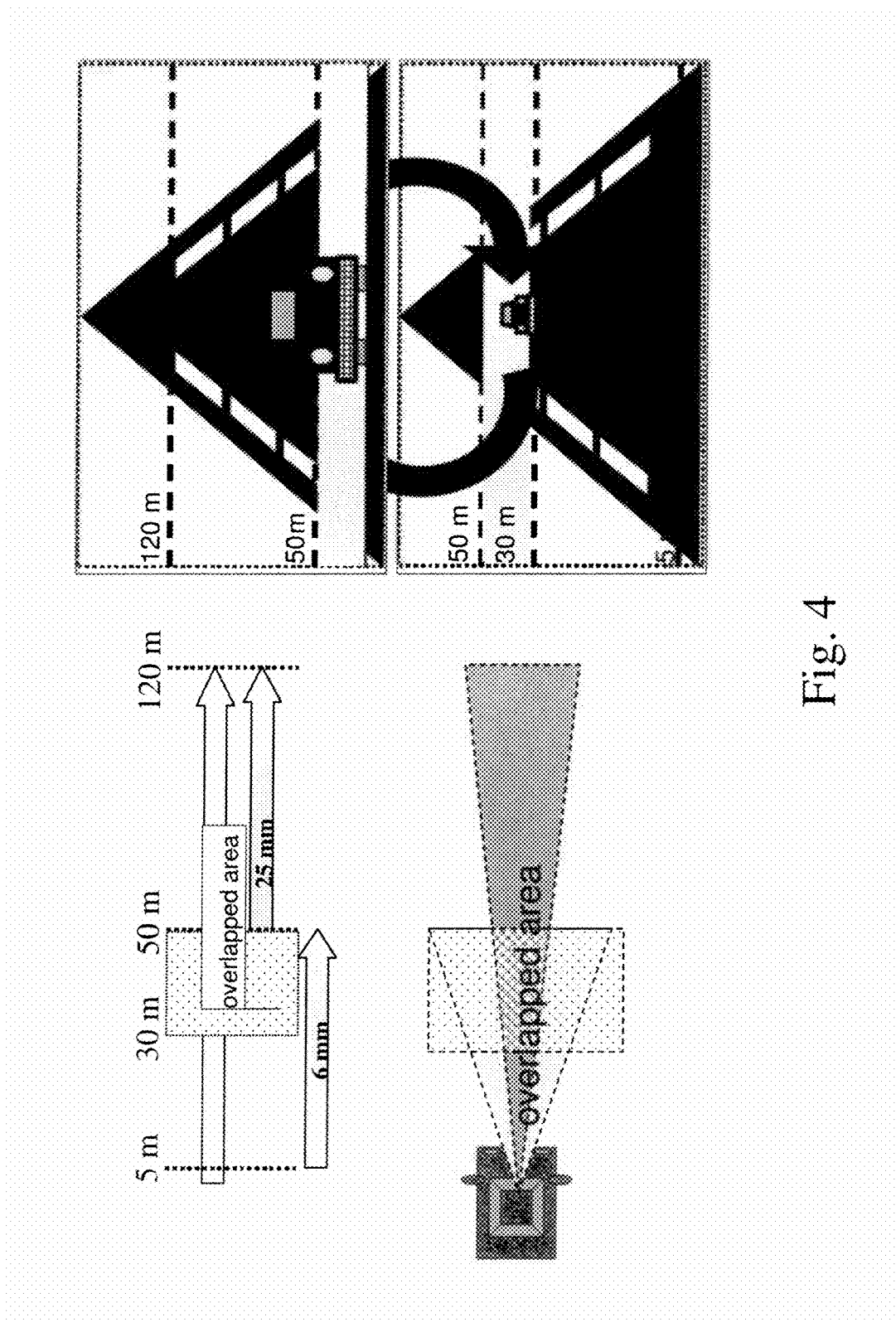
FIG. 4 is a diagram schematically showing an overlapped area of a near-field image and a far-field image.

After the distance D to the front vehicle has been estimated, the near-field image capture device and the far-field image capture device respectively determine whether there is any vehicle existing in the preset range in Step S32 and Step S32'. In one embodiment, the preset range is from 30 to 50 m. Refer to FIG. 4. The near-field detection range and the far-field detection overlap in the range from 30 to 50 m. If there is no vehicle in the overlapped area, the system examines whether the distance to the front vehicle is too small according to the speed of the user's vehicle in Step S36. If the distance to the front vehicle is indeed too small, the system sends out a collision warning message in Step S38. If there is a vehicle in the overlapped area, the distance calibration algorithm calibrates the roughly-estimated distance in Step S34.

Figure 5A:
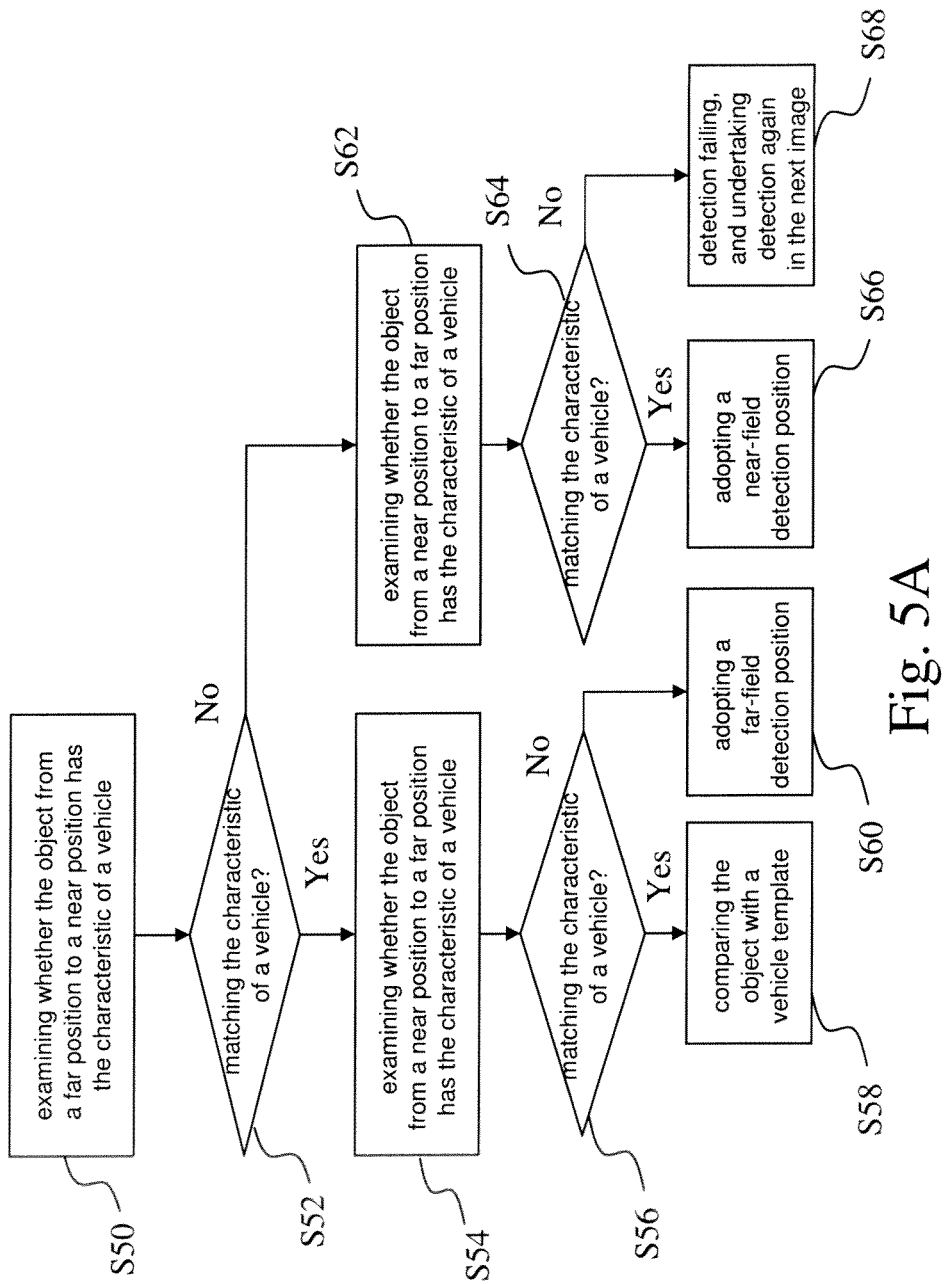
FIG. 5A and FIG. 5B are flowcharts of the distance calibration processes.
Figure 5B:
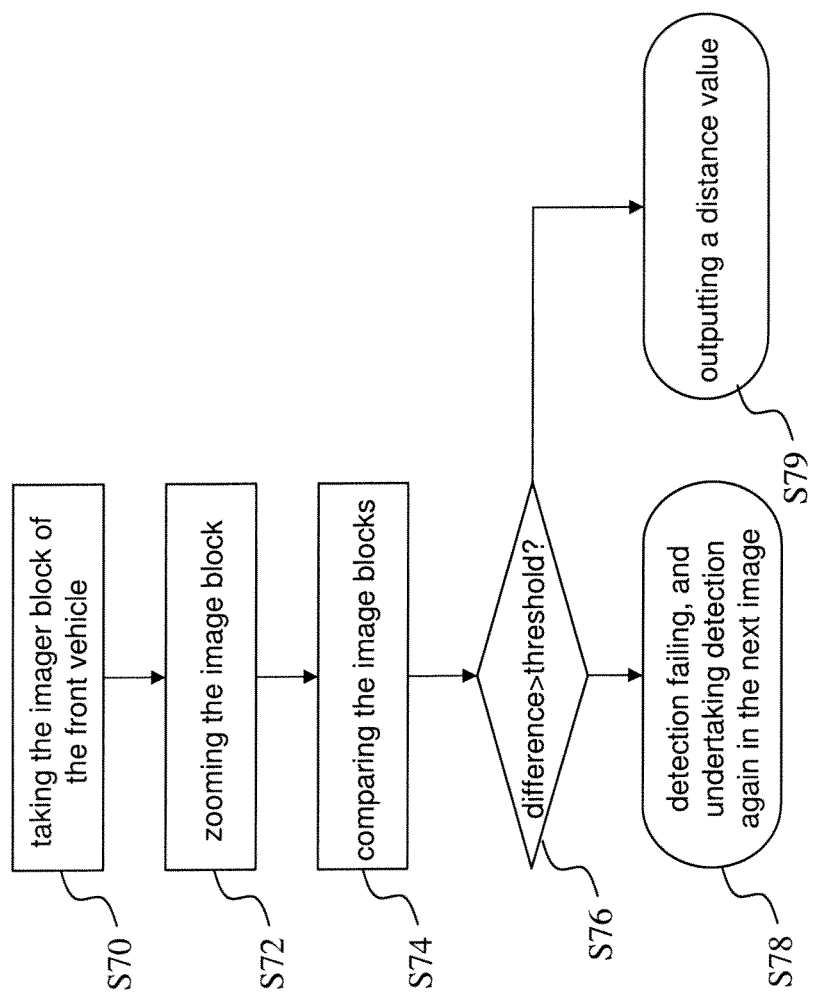

Refer to FIG. 5A and FIG. 5B for the details of the distance calibration process of Step S34 in FIG. 2. In Step S50 and Step S52, the system examines whether the object from a far position to a near position has the characteristic of a vehicle, wherein the system uses the Sobel edge detection method to examine whether the horizontal edges and the vertical edges of the object match the dimensions of a normal vehicle. If the horizontal edges and the vertical edges of the object match the dimensions of a normal vehicle in Step S52, the system uses the Sobel edge detection method to examine whether the object from a near position to a far position has the characteristic of a vehicle in Step S54 and Step S56. If the horizontal edges and the vertical edges of the object match the dimensions of a normal vehicle in Step S56, the system compares the object with a vehicle template in Step S58. If the horizontal edges and the vertical edges of the object do not match the dimensions of a normal vehicle in Step S56, a far-field detection position is adopted in Step S60. If the horizontal edges and the vertical edges of the object do not match the dimensions of a normal vehicle in Step S52, the system uses the Sobel edge detection method to examine whether the object from a near position to a far position has the characteristic of a vehicle in Step S62 and Step S64. If the object matches the characteristic of a normal vehicle in Step S64, a near-field detection position is adopted in Step S66. If the object does not match the characteristic of a normal vehicle in Step S64, it means that the detection fails, and the detection will be undertaken again in the next image (Step S68). FIG. 5B shows the process of vehicle template comparison. In Step S70, the system takes the imager block of the front vehicle in the far-field image. In Step S72, the system zooms (expands) the image block by a ratio of the vehicle width in the near-field image/the vehicle width in the far-field image. In Step S74, the image blocks subtract for comparison. In Step S76, the system determines whether the difference of the image blocks is smaller than the preset threshold. If the difference is not smaller than the preset threshold, the detection is determined to be a failure in Step S78, and the detection will be undertaken again in the next image. If the difference is smaller than the preset threshold, the system outputs the distance in Step S79.

The system uses the distance output in Step S79 and the speed of the user's vehicle to determine whether the user's vehicle approaches the front vehicle too much in Step S36. If the user's vehicle indeed approaches the front vehicle too much, a front-collision warning is sent out in Step S38.

Figure 6A:
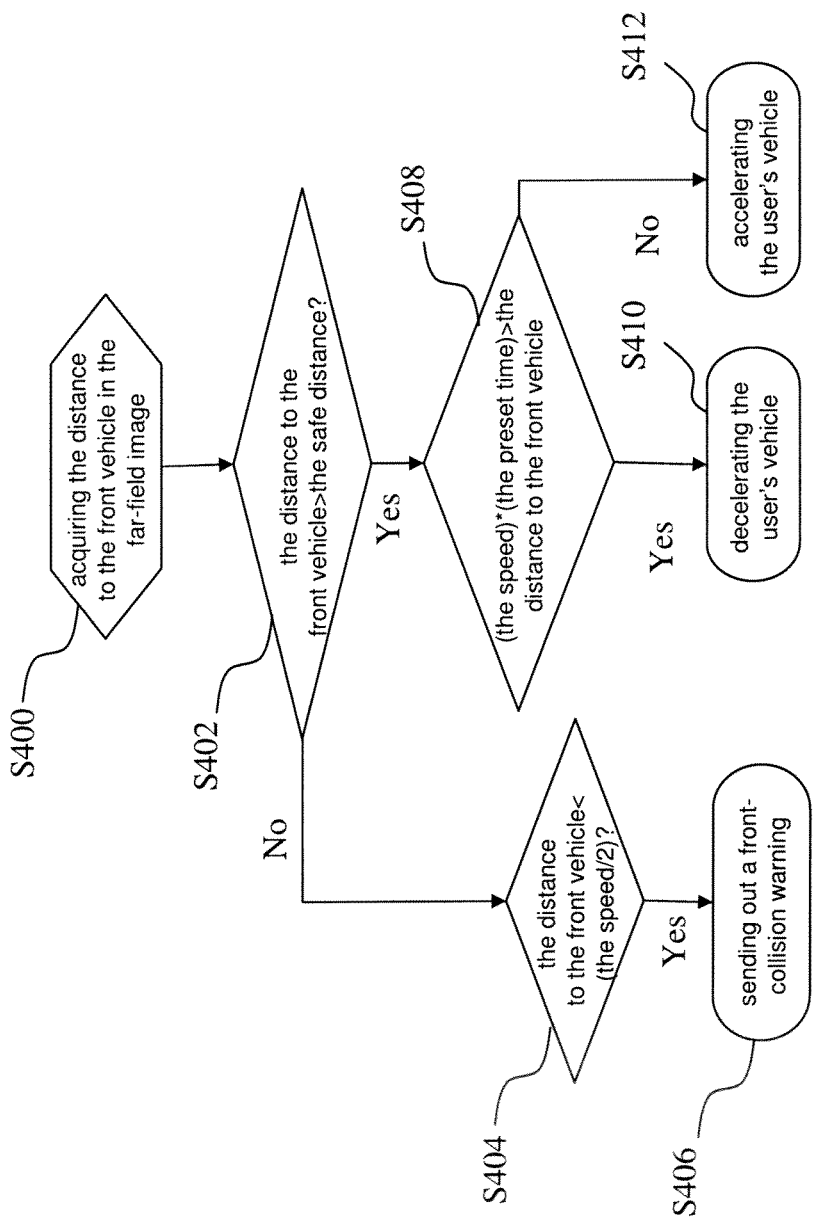
FIG. 6A and FIG. 6B are respectively flowcharts of the small-vehicle warning process and the large-vehicle warning process.
Figure 6B:
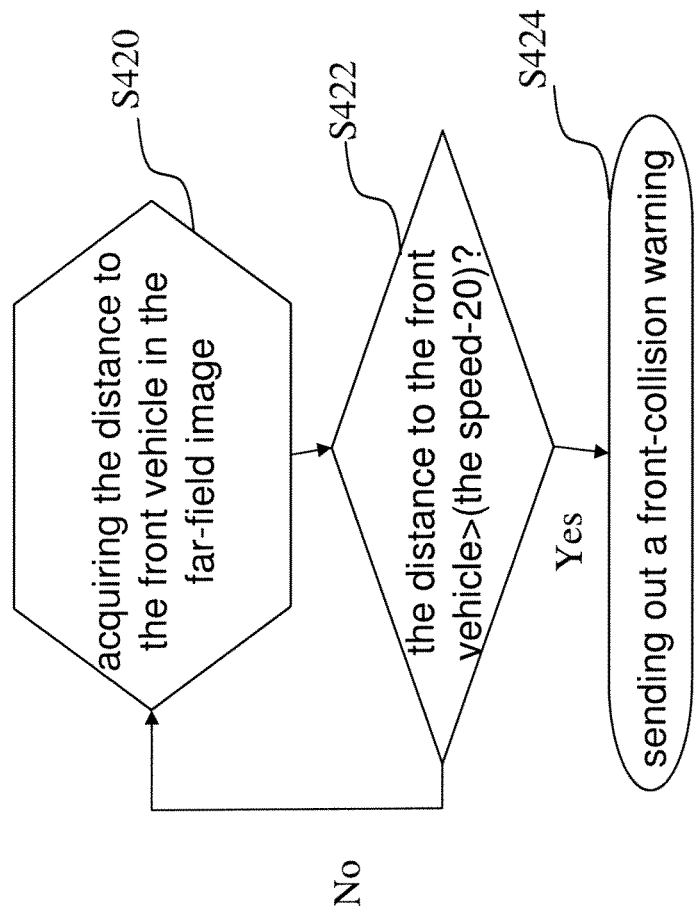

In Step S32' of FIG. 2, the system examines whether there is any vehicle existing in the far-field image within the range of from 30 to 50 m. If there is a vehicle in the range, the abovementioned calibration is undertaken in Step S34. If there is no vehicle in the range, the system sends out a small-vehicle warning in Step S40 or a large-vehicle warning in Step S42. Refer to FIG. 6A for the process of the small-vehicle warning. In Step S400, the system acquires the distance to the front vehicle in the far-field image. In Step S402, the system uses the distance to the front vehicle and the vehicle status signals (such as the speed signal) output by the vehicle status sensing unit to determine whether the distance is greater than the preset safe distance. If the distance is not greater than the safe distance, the system examines whether the value of the distance is smaller than half the value of the speed (the preset value in the embodiment) in Step S404. If the value of the distance is smaller than half the value of the speed, the system sends out a front-collision warning to remind the user not to approach the front vehicle too much in Step S406. If the distance is greater than the safe distance in Step S402, the system examines whether the value of the speed multiplied by a preset time is greater than the distance in Step S408. If the value of the speed multiplied by the preset time is greater than the distance, the system automatically slows down the user's vehicle in Step S410. If the value of the speed multiplied by the preset time is not greater than the distance, the system automatically speeds up the user's vehicle in Step S412. What is undertaken in Step S410 and Step S412 is the so-called adaptive cruise control function, wherein the dual-vision driving safety warning device of the present invention controls the accelerator to maintain the safe distance between the user's vehicle and the front vehicle according to the speed of the user's vehicle. Once the user pushes down the brake, the adaptive cruise control function is shut down. Refer to FIG. 6B for the process of the large-vehicle warning. In Step S420, the system acquires the distance to the front vehicle in the far-field image. In Step S422, the system examines whether the distance is smaller than the value of the speed subtracted by 20 (the preset value in the embodiment). If the distance is smaller than the value of the speed subtracted by 20, the system sends out a front-collision warning (Step S424). If the distance is not smaller than the value of the speed subtracted by 20, the process returns to Step S420.

Figure 7:
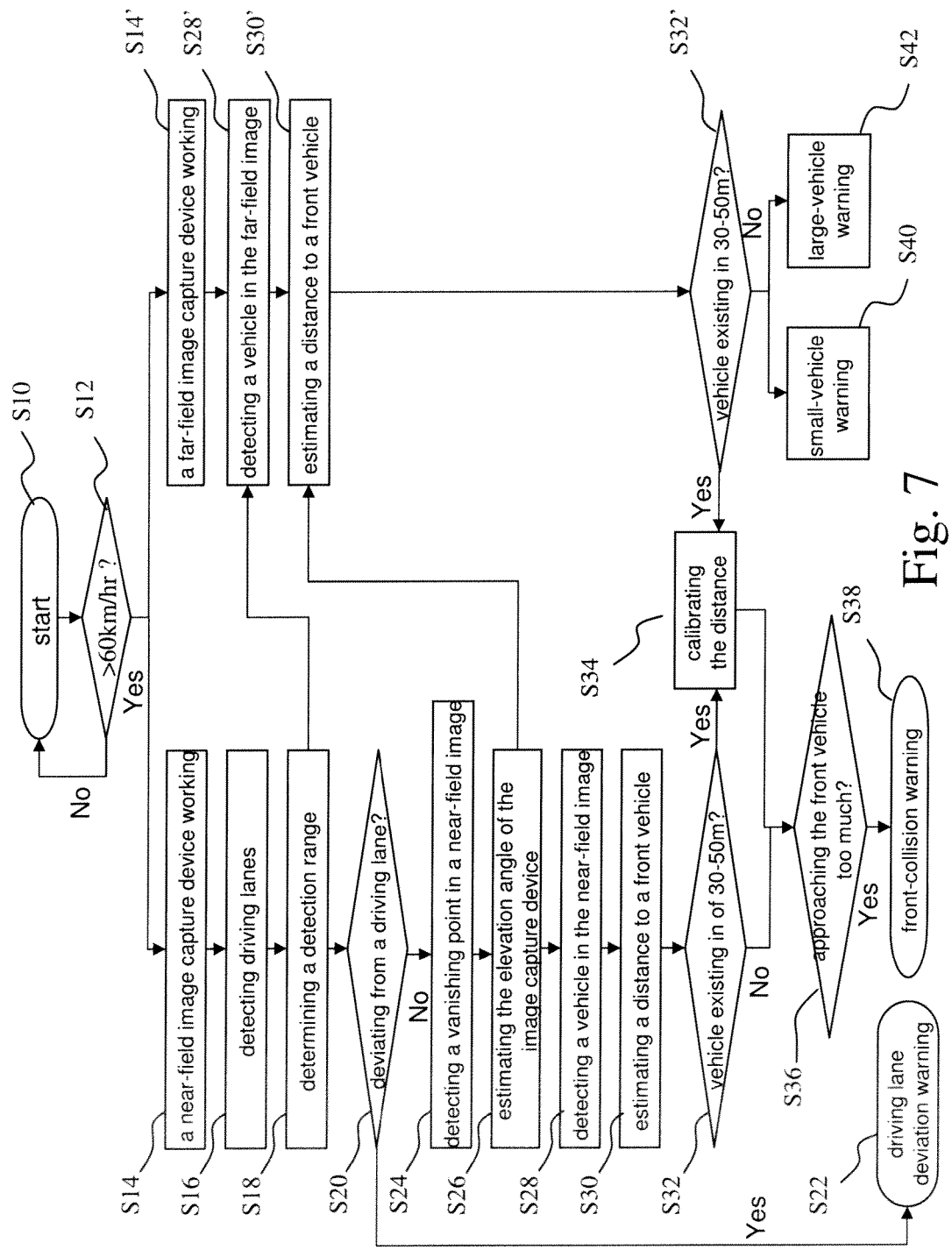
FIG. 7 is a flowchart of a dual-vision driving safety warning method in an embodiment wherein the two image capture devices respectively have different angles.

One characteristic of the present invention is that the device of the present invention has two image capture devices respectively having different elevation angles for capturing the near-field images and the far-field images. When the two image capture devices have an identical elevation angle, Step S16'-Step S28' can be omitted, as shown in FIG. 7. In such a case, the far-field vehicle detection of Step S28' is undertaken in the detection range determined by the near-field image; the distance to the front vehicle in the far-field image is calculated from the elevation angle of the near-field image capture device.

In conclusion, the present invention proposes a dual-vision driving safety warning device and a method thereof. The device of the present invention comprises at least two image capture devices, which respectively capture the near-field and far-field images at the same time to detect the lane marks and estimate the distance to the front vehicle. The distances respectively detected by the near-field and far-field image capture devices are intercompared to calibrate the estimated distance. Further, the device determines whether to send out a warning, considering the distance to the front vehicle and the vehicle status signals of the user's vehicle. Thereby, the present invention can perform a driving lane deviation warning, a front-collision warning and an adaptive cruise control function, exempt from the interference by the vibration of the vehicle.

The embodiments described above are only to exemplify the present invention but not to limit the scope of the present invention. Any equivalent modification or variation according to the spirit of the present invention is to be also included within the scope of the present invention.

What is claimed is:

1. A dual-vision driving safety warning device comprising
an image capture unit including at least two image capture devices installed in a user's vehicle, wherein said image capture devices respectively have different elevation angles and respectively capture a near-field image and a far-field image of a front traffic environment, and wherein said near-field image and said far-field image at least contain images of complete lane marks;
a vehicle status sensing unit sensing at least one status signal of said user's vehicle, including a signal of speed, braking, or a direction light;
an image processing unit including a lane mark detection algorithm, a detection angle algorithm, a front vehicle detection algorithm, a distance estimation algorithm and a distance calibration algorithm, using them to process said near-field image and said far-field image and using said detection angle algorithm and said elevation angles with respect to a front vehicle in said near-field image and said far-field image to calculate a distance between said user's vehicle and said front vehicle;
a warning judgement logic integrating said vehicle status signal and calculation results of said image processing unit to perform an adaptive cruise control function and sending out a control signal when said user's vehicle deviates from a driving lane or approaches said front vehicle too much; and
at least a warning unit connected said image processing unit and said vehicle status sensing unit, and controlled by said control signal to send out a warning signal.

2. The dual-vision driving safety warning device according to claim 1, wherein said distance estimation algorithm roughly estimates distances of said front vehicle in said near-field image and said far-field image captured by said image capture devices, and wherein said distance calibration algorithm intercompares and calibrates said distances to obtain a correct distance to said front vehicle.

3. A dual-vision driving safety warning method comprising steps:
using an image capture unit including at least two image capture devices installed in a user's vehicle and respectively having different elevation angles to respectively capture a near-field image and a far-field image of a front traffic environment, wherein said near-field image and said far-field image at least contains images of complete lane marks;

using an image processing unit to process said near-field image and said far-field image by using a lane mark detection algorithm, a detection angle algorithm, a front vehicle detection algorithm, a distance estimation algorithm and a distance calibration algorithm, wherein said processing unit makes use of processing results, at least one vehicle status signal detected by a vehicle status sensing unit, said detection angle algorithm and said elevation angles with respect to a front vehicle in said near-field image and said far-field image to calculate distances between said user's vehicle and said front vehicle in said near-field image and said far-field image; and using a warning judgement logic to output a control signal to enable at least a warning unit to send out a warning signal when said user's vehicle deviates from a driving lane or approaches said front vehicle too much.

4. The dual-vision driving safety warning method according to claim 3, wherein said image capture devices are CMOS (Complementary Metal Oxide Semiconductor) elements or CCD (Charge Coupled Device) elements.

5. The dual-vision driving safety warning method according to claim 3, wherein said front vehicle detection algorithm uses a Sobel edge detection method to detect horizontal edges and vertical edges of a front object and determine whether a width and a height of said front object match dimensions of a normal vehicle, and wherein if said width and said height of said front object match said dimensions of said normal vehicle, said distance estimation algorithm is used to estimate a distance to said front vehicle.

6. The dual-vision driving safety warning method according to claim 3, wherein said distance estimation algorithm roughly estimates distances of said front vehicle in said near-field image and said far-field image images captured by said image capture devices, and wherein said distance calibration algorithm intercompares and calibrates said distances to obtain a correct distance to said front vehicle.

7. The dual-vision driving safety warning method according to claim 3, wherein distances are respectively worked out from said near-field image and said far-field image, and wherein said distances are intercompared and calibrated to obtain a correct distance.

* * * * *